(12) United States Patent
Meadway et al.

(10) Patent No.: US 8,301,634 B2
(45) Date of Patent: Oct. 30, 2012

(54) STORING AND RETRIEVING OBJECTS ON A COMPUTER NETWORK IN A DISTRIBUTED DATABASE

(75) Inventors: Michael Meadway, Driftwood, TX (US); Stanford Tharp, Bainbridge Island, WA (US)

(73) Assignee: Pointofdata Corporation, Bremerton, WA (US)

( * ) Notice: Subject to any disclaimer, the term of this patent is extended or adjusted under 35 U.S.C. 154(b) by 235 days.

(21) Appl. No.: 12/402,039

(22) Filed: Mar. 11, 2009

(65) Prior Publication Data

US 2009/0182767 A1 Jul. 16, 2009

Related U.S. Application Data

(62) Division of application No. 11/043,864, filed on Jan. 26, 2005, now Pat. No. 7,523,130.

(60) Provisional application No. 60/540,362, filed on Jan. 28, 2004, provisional application No. 60/553,383, filed on Mar. 16, 2004, provisional application No. 60/553,378, filed on Mar. 17, 2004, provisional application No. 60/553,377, filed on Mar. 17, 2004.

(51) Int. Cl.
*G06F 7/00* (2006.01)
*G06F 17/30* (2006.01)

(52) U.S. Cl. .................................... 707/740; 707/803

(58) Field of Classification Search ................ 707/740, 707/803, 999.1, 999.102, 736
See application file for complete search history.

(56) References Cited

U.S. PATENT DOCUMENTS

| | | | | |
|---|---|---|---|---|
| 4,408,273 | A | | 10/1983 | Plow |
| 5,303,379 | A | * | 4/1994 | Khoyi et al. ................. 717/166 |
| 5,369,778 | A | * | 11/1994 | San Soucie et al. ............... 1/1 |
| 5,634,124 | A | * | 5/1997 | Khoyi et al. ....................... 1/1 |
| 5,694,593 | A | | 12/1997 | Baclawski |
| 5,748,954 | A | | 5/1998 | Mauldin |
| 5,864,863 | A | | 1/1999 | Burrows |
| 5,897,639 | A | | 4/1999 | Greef et al. |
| 5,983,216 | A | | 11/1999 | Kirsch et al. |
| 6,154,738 | A | | 11/2000 | Call |
| 6,256,622 | B1 | | 7/2001 | Howard, Jr. et al. |
| 6,336,117 | B1 | | 1/2002 | Massarani |
| 6,513,112 | B1 | * | 1/2003 | Craig et al. ...................... 713/1 |
| 6,516,337 | B1 | | 2/2003 | Tripp et al. |
| 6,675,205 | B2 | | 1/2004 | Meadway et al. |
| 6,725,228 | B1 | | 4/2004 | Clark et al. |
| 6,785,690 | B1 | * | 8/2004 | Davidson .................... 707/802 |
| 6,976,053 | B1 | | 12/2005 | Tripp et al. |
| 6,983,322 | B1 | | 1/2006 | Tripp et al. |
| 7,032,000 | B2 | | 4/2006 | Tripp |
| 7,133,870 | B1 | | 11/2006 | Tripp et al. |
| 7,523,130 | B1 | | 4/2009 | Meadway et al. |
| 2002/0073080 | A1 | * | 6/2002 | Lipkin ............................ 707/3 |
| 2005/0066338 | A1 | * | 3/2005 | Bloesch et al. ............... 719/328 |
| 2011/0264628 | A1 | | 10/2011 | Sokolan et al. |
| 2011/0264646 | A1 | | 10/2011 | Sokolan et al. |
| 2011/0265177 | A1 | | 10/2011 | Sokolan et al. |
| 2011/0270834 | A1 | | 11/2011 | Sokolan et al. |

* cited by examiner

*Primary Examiner* — Greta Robinson
(74) *Attorney, Agent, or Firm* — Woodcock Washburn LLP

(57) ABSTRACT

A distributed, object-oriented database engine utilizing independent, intelligent processing nodes as a cooperative, massively parallel system with redundancy and fault tolerance. Instead of using traditional methods of parallelism as found in most distributed databases, the invention utilizes a messaging system and a series of message processing nodes to determine where objects and data associated with objects are stored. The architecture is loosely coupled, each node independently determining if it manages or routes storage and retrieval requests.

26 Claims, 12 Drawing Sheets

Replicated SQL Database on Parallel Servers
-- Prior Art --

Internet Search Engine
-- Prior Art --

Distributed SQL Table
-- Prior Art --

Inverted Index
-- Prior Art --

STORING AND RETRIEVING OBJECTS ON A COMPUTER NETWORK IN A DISTRIBUTED DATABASE

CROSS REFERENCE TO RELATED APPLICATION

This application is a divisional of U.S. utility application Ser. No. 11/043,864, filed Jan. 26, 2005, now U.S. Pat. No. 7,523,130, issued on Apr. 21, 2009; which is based on and claims priority from provisional application 60/540,362, filed Jan. 28, 2004; provisional application 60/553,383, filed Mar. 16, 2004; provisional application 60/553,378, filed Mar. 17, 2004; and provisional application 60/553,377, filed Mar. 17, 2004.

FIELD OF THE INVENTION

The present invention relates generally to data distributed within a network and more particularly to a method and system for storing, cataloging and retrieving a set of objects, associated data and links between objects in one or more contexts, distributed within a network.

BACKGROUND OF THE INVENTION

Recently, the ability of devices to collect large amounts of data has increased dramatically. This includes not only consumer devices such as electronic cameras, video recorders and cellular telephones, but also devices embedded within assemblies, and sensors used for tracking product and asset movement. Additionally, the amount of information publicly available has increased geometrically, with the Internet representing the largest distributed collection of data currently available. In addition to the sheer quantity of information, much information now has temporal and spatial attributes, such that the value of the information is far greater when placed in context with other information. Prominent examples are the use of instant location sensing for advertising purposes on cellular telephone networks, and the ability to mark electronic photographs with the time and location of their creation.

While the data collection and retrieval capabilities of devices and the Internet have grown tremendously, the ability to perform data manipulation and retrieval operations on that data has been slow to catch up. In particular, ad hoc queries of unstructured information are resource-intensive and require large capital investment in centralized, massively parallel database systems with specialized software. The present invention creates a means by which structured and unstructured data may be stored, retrieved and searched using a highly expandable architecture that retains high performance even as it grows to large sizes, and it provides for managing data sets using resources that may not be constantly or reliably available, or which for security reasons must be duplicated to prevent loss of data. By contrast, today's approaches for solving scalability, availability and cost issues include:

Using multiple copies of a database to allow parallel searches on separate systems and thus increase performance and reduce the potential for loss of data. This approach is used by the popular open-source database "MySQL", wherein a master database server uses a series of read-only "slave" servers to distribute query loads. In FIG. 8, a block diagram of this arrangement is shown. SQL commands 810 are received from a client application 801, and transmitted through a network 802 to be received by a master SQL server 803. The master SQL server 803 dispatches the SQL commands 811 received by one of the slave servers 805-807, normally attempting to find the slave with the lowest overall load factor. Updates received by the master SQL server 803 are applied in parallel to all slave SQL servers 805-807.

Distributing known portions of a database across many systems, using a central index to determine the system on which the portions of the database required are located. This approach is used by many Internet search engines, most notably Google, AltaVista and FAST. FAST in particular presents a highly parallel system in which each individual server contains a series of proprietary embedded processors with private memory, each searching a small fragment of the total database. Google uses a massive number of low-cost servers, each of which also routes data packets to reduce network infrastructure loads when switching points in the network must be used. In all cases, a central meta-data index is retained which directs applications requesting data to the servers containing that data. FIG. 9 is a block diagram of the functional elements in a typical Internet search engine 900. On the searching side, a web server 901 generates requests from an HTML form which are then handled by query processors 902-904. The query processors 902-904 generate search requests which are then dispatched in parallel to a series of database servers 905-910, each of which contains a subset of the total collection of documents or data being searched. Each database server 905-910 subsequently returns a small set of matching documents; all sets are then merged by the query processors 902-904 and returned to the web server 901 for presentation. On the data collection side, a web crawler 914 collects the text from web pages scattered across the Internet, forwarding these to a series of parsers 911-913, which reduce each page to a set of unique words. These unique words are then stored by the database servers 905-910 for later searches.

Distributing subsets of a database across many systems. This is done in large SQL databases such as Oracle, where a server or set of servers contains a single column or index associated with the rows in a relational database. FIG. 10 is a block diagram of the functional elements within a distributed relational database 1000. In this arrangement, an SQL interpreter and query processor 1001 is used to forward queries to an index database server 1002 which returns the row numbers for all matching rows in a table. The SQL interpreter and query processor 1001 subsequently retrieves the columns for the matching tables from the database servers 1003-1006 that contain the individual columns of each table.

In addition to the difficulties represented by managing large data sets, present database engines are not typically designed to allow flexible data retrieval using unstructured source data, such as word processing documents, images, audio files, and other types of information that do not fall within the traditional model of a relational database. In an unstructured database system, objects with a series of attributes are stored, and the attributes are made searchable for later retrieval.

Internet search engines represent a special case of the unstructured search engine, where an inverted index of the content of web pages and word processing documents is created. However, in most systems, the only web attributes that are stored are the words within the page and the frequency of occurrence of those words, even though there are many other important attributes, such as the date and time of creation, the total size of the page, implied and implicit concepts in the content, abstracts, and the physical and logical location of the page.

Another difficulty experienced by current unstructured databases is the lack of a temporal or physical capability; that is, current systems do not identify the physical location of a document and the content of the document through successive revisions. For example, Google provides a searchable index of the World Wide Web as of the last indexing operation; historical content is not maintained. Even if such information were maintained by a search engine provider as Google, the methods employed by Google for data storage and retrieval would not be capable of managing the ever-expanding storage requirements.

There is a need for a scalable, robust and flexible database architecture which provides a means of storing large quantities of unstructured data.

SUMMARY OF THE INVENTION

Embodiments of the present invention use a distributed series of independent, intelligent nodes, called "agents," within a computer network to store data and links to data associated with events, where an event is defined by what will be referred to as an "object" with a universally unique identifier. The universally unique identifier is composed of several sub-identifiers or key fields, including the absolute time with a high degree of accuracy, the location context in which the event occurred, and a series of indicators defining the precise location of the event. By definition, an event can occur in only one exact location at any one instant, thereby ensuring that all identifiers are unique, and all can be referenced without resorting to a centralized index for duplication removal. Event objects may also be linked to each other bi-directionally, where each link is itself an event object, and the linkage is associated further with a unique context. Each event object contains a minimal data payload which is used to provide references to other stored data that may or may not be stored in proximity with the event object itself. As disclosed in application Ser. No. 11/043,864, event objects and links between them are manipulated using a series of messages passed between agents. Each agent uses a series of rules combined with other information to determine the disposition of messages received and/or actions to be taken. For the purposes of the following discussion, and as defined above, the term "object" refers to an event with a unique identifier which references any physical or abstract entity, including electronic data. "Attribute" is defined to be a facet or type of information with one or more distinct versions stored as an event object and associated with other objects through linkages in one or more contexts. For example, a person would have a name attribute or facet with a certain value, such as "John." The facet or attribute is represented as an object linked with the person who is also represented by yet another object rather than a piece of meta-data associated with the object by a pointer as is commonly understood. The term "context" refers to a collection of related links. For example, an object representing the occurrence of a date may be linked to multiple objects through multiple linkage contexts, depending upon the nature of the link. Therefore, a date may represent the birthday of a person, while simultaneously representing a historical event that occurred elsewhere at the same instant. Thus, both the person-event object and the historical-event object are linked to the date-object, but in different contexts. Thus, when we describe attributes or meta-data, we are in fact describing objects that are linked to another object by one or more linkages in one or more contexts, and this must be kept in mind when viewing diagrams or other material describing the present invention.

According to one aspect of some embodiments of the present invention, each agent references a list or plurality of lists of remote nodes to which the node may connect via a messaging system. For the purposes of this discussion, a network of agents is defined as one or more agents.

According to another aspect of some embodiments of the present invention, an external entity or plurality of entities may connect to any agent in the network of agents via the same messaging system through which agents communicate with each other.

According to another aspect of some embodiments of the present invention, a plurality of agents may exist within the confines of a computer system or plurality of computer systems.

According to another aspect of some embodiments of the present invention, an agent may reside within a traditional computer system or within any device capable of supporting processing and communications functions necessary for the operation of an agent.

According to another aspect of some embodiments of the present invention, each agent references a set of specifications that indicate what messages the agent may process, as well as a set of specifications for each remote agent indicating what messages a remote agent or a plurality of remote agents may process.

According to another aspect of some embodiments of the present invention, messages received by an agent from a transmitting entity or plurality of entities may be processed within the agent or forwarded to a plurality of remote agents based on the specifications for each remote agent and the resulting matches between the content of the message and the remote agents.

According to another aspect of some embodiments of the present invention, results of processing messages received by the agent are sent to the application or entity that transmitted the original message to the agent.

According to another aspect of some embodiments of the present invention, the entity transmitting messages to the agent may transmit messages either as a series of independent communications or as parts of a continuous communication system.

According to another aspect of some embodiments of the present invention, agents may communicate with each other using each message as an independent communication event or as part of a continuous communication system.

According to another aspect of some embodiments of the present system, agents may terminate connections with remote agents based on the content of messages received by an entity sending messages to the agents, or based on the content of messages received from remote agents, or based on the processing state of the agent or external inputs to the agent.

According to another aspect of some embodiments of the present invention, any messages generated by one remote agent or a plurality of remote agents that received a copy of the original message received by the agent from an entity or plurality of entities are forwarded to the entity or plurality of entities that transmitted the original message to the agent.

According to another aspect of some embodiments of the present invention, a message transmitted to the agent by an entity or a plurality of entities may be forwarded to an agent or plurality of agents that are designated as the recipients of all messages which the present agent and the plurality of remote agents to which the present agent may send messages are unable to process.

According to another aspect of some embodiments of the present invention, messages received or transmitted by agents and entities communicating with agents contain a message type, a unique identifier, a plurality of structured data elements, a plurality of unstructured data elements and a plurality of message path identifiers.

According to another aspect of some embodiments of the present invention, the structured data elements contained in a message consist of, at a minimum, a data element name and a data element content object for each structured data element.

According to another aspect of some embodiments of the present invention, the unstructured data elements contained in a message consist of, at a minimum, a data element length and a data element content object for each unstructured data element.

According to another aspect of some embodiments of the present invention, a message path consists of a plurality of unique agent identifiers arranged as a list, such that the list of agent identifiers reflects the path of transmission through a plurality of agents.

According to another aspect of some embodiments of the present invention, the message path contained within a message is appended to upon transmission from an agent to a plurality of other agents.

According to a further aspect of some embodiments of the present invention, the method of transmission between a plurality of agents and entities communicating with a plurality of agents includes, but is not limited to, a store-and-forward messaging system, a direct connection between agents utilizing a data stream transmitted over an electronic network, a shared memory segment system such as is used in parallel processing systems, and a storage-based message passing system utilizing shared external storage attached to a plurality of computers.

According to another aspect of some embodiments of the present invention, messages transmitted between a plurality of agents contain a unique identifier that is further subdivided such that the identifier contains a set of segments.

According to a further aspect of some embodiments of the present invention, agents receiving or transmitting messages determine the path of transmission and processing steps based upon the content of the unique identifier segments, as outlined previously, and the type of message processed.

According to another aspect of some embodiments of the present invention, when processing a received message, an agent examines the content of the unique identifier segments and the type of message to determine if the message may be processed locally based on the content of the unique identifier segments.

According to a further aspect of some embodiments of the present invention, when processing a received message, an agent examines the content of the unique identifier segments and the type of message to determine which of the plurality of remote agents that the present agent is allowed to communicate with may receive a copy of the message.

According to a further aspect of some embodiments of the present invention, messages may be generated by an agent based on the processing results of previously received messages within the agent, or messages received from an entity or remote agents which are processing messages previously received. Such messages may be transmitted to entities or remote agents based on a plurality of rules.

According to a further aspect of some embodiments of the present invention, messages not deliverable due to communications errors or restrictions are queued for later transmission.

According to a further aspect of some embodiments of the present invention, a plurality of rules may be specified to cause an agent to receive but not transmit messages, or to transmit but not receive messages, or both transmit and receive messages based on local state or configuration information, state or configuration received from a plurality of remote agents, or state or configuration received from a plurality of external or internal sources. As is commonly understood by those versed in the art, the term "state" refers to the current instantaneous set of values encompassing the environment or internal configuration of a real, electronic, or abstract object. As an example, the "state" of a computer server includes the temperature of system components, the local time of day, the list of executing programs and any communication channels presently configured for transfer of data with other systems. Thus, an agent or plurality of agents may receive, transmit, route or otherwise process messages based on specific characteristics of those systems and communications channels involved or accessible to the systems involved in the message flow, or data that is made available to and collected by such entities.

According to another aspect of some embodiments of the present invention, unique identifier segments may be associated with external logical or physical values such as location information or temporal information (i.e., date and time).

According to another aspect of some embodiments of the present invention, agents may report the existence of attributes stored within the agent without returning the actual content of those attributes.

According to a further aspect of some embodiments of the present invention, agents store electronically created objects, including, but not limited to, word processing documents, audio files and images in a storage management system.

According to another aspect of some embodiments of the present invention, the file storage system contained within the agents maintains a list of all objects stored including statistical and meta-data for each object and the storage media within which the objects reside.

According to another aspect of some embodiments of the present invention, electronic objects stored within the file storage system within an agent are given unique identifiers such that attributes referencing these files may be used by remote agents or entities communicating with agents for retrieval and identification purposes.

According to another aspect of some embodiments of the present invention, attribute content and the content of electronic objects stored within agents are processed upon receipt and storage by the agent such that an inverted index is created, as will be understood by those generally proficient in the art.

According to a further aspect of some embodiments of the present invention, attributes are stored in database files within the plurality of agents, with such databases including, but not limited to, traditional relational databases, as well as proprietary or special databases.

According to a further aspect of some embodiments of the present invention, agents contain a database engine designed such that the individual segments of the unique identifiers associated with attributes are indexed to allow retrieval of the associated attributes using sparse unique identifier values, wherein a range of contiguous or non-contiguous values for a plurality of unique identifier segments are used for retrieving attributes stored within an agent.

According to another aspect of some embodiments of the present invention, unique identifiers are stored within the database engine, such that each segment of the unique identifier is stored as a separate indexed record within a traditional sorted index, as understood by those generally proficient in the art.

According to a further aspect of some embodiments of the present invention, each index record for unique identifier segments contains the number of the segment within the unique identifier, the content of the segment, and the record number or file position offset of the attribute data as stored within a file.

According to a further aspect of some embodiments of the present invention, six individual index files are created within the database engine such that the possible permutations of the unique identifier segment number, unique identifier segment value and record number or file position offset of the attribute data are stored within the index files.

According to another aspect of some embodiments of the present invention, each of the previously recited methods is performed by a program contained on a computer-readable medium, such as a CD-ROM.

According to another aspect of some embodiments of the present invention, index records for a given segment of the unique identifier may be stored in separate index files, such that the name of the index file or meta-data associated with the index file indicates the segment number with which the index records are associated.

DETAILED DESCRIPTION OF THE INVENTION

Figure 2:
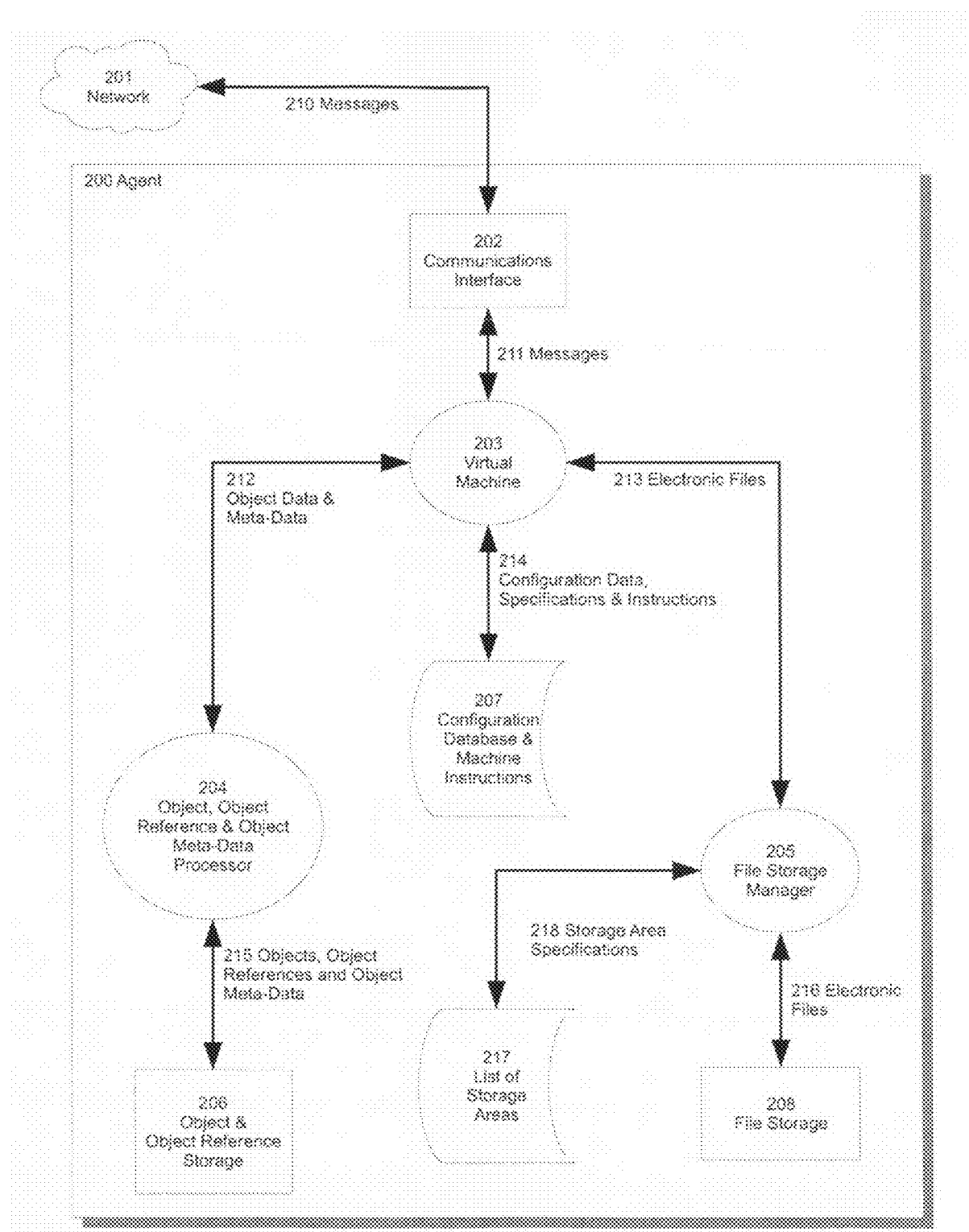
FIG. 2 is a functional block diagram of the components of an agent.

FIG. 2 is a functional block diagram of agent node 200 and the data flow within that agent according to one embodiment of the present invention. Agent node 200 includes communications interface 202, described in more detail below, operable with computer network 201 to which and from which messages 210 are communicated. Agent 200 also includes virtual machine 203, described in more detail below, which retrieves configuration data 214 from configuration database 207, and which stores and retrieves object data and meta-data 212 to and from object processor 204, which will be described in more detail later in this document. Object processor 204 stores and retrieves objects, object references, and object data 215 to and from object storage 206. Agent 200 also includes file storage manager 205, which will be described in more detail below, to which virtual machine 203 sends electronic files 213. Communications interface 202 may consist of a typical stream-based socket connection via the Internet, a local area network, a store-and-forward message system, a series of queues, shared memory or shared storage devices. Regardless of the method, virtual machine 203 periodically listens for incoming messages 211 and processes them as they arrive.

In a typical embodiment, virtual machine 203 receives a message 211 containing a unique identifier with key segments and determines if the message should be forwarded to other agent nodes. If a message is to be forwarded, the message is sent by virtual machine 203 to communications interface 202, which then transmits message 210 to network 201. If the message is to be processed locally, this is done such that object data and meta-data 212 and object references 215 are stored locally via object processor 204, and electronic files 213 are sent to file storage manager 205, which subsequently stores electronic files 216 in file storage media 208.

Virtual machine 203 determines the disposition of messages 211 by comparing the values of the unique identifier key segments against the range of allowable segment values as determined by retrieving range definitions from configuration database 207. For example, a range of allowable values is defined for the first key segment, and the value of that key segment is compared against the range of allowed values retrieved from configuration database 207. If the key value is out of range, virtual machine 203 will not perform local processing of the message. The same comparison is performed for all key segment values until all key segment values have been processed. In addition to checking the key segment ranges for virtual machine 203, virtual machine 203 retrieves a list of remote agents 214 from configuration database 207. For each agent to which messages may be forwarded from the present agent, virtual machine 203 performs a range test of the message key segment values against the range values defined for each agent. Agents for which the message key segment values fall within the ranges for the agent will receive a forwarded copy of message 211.

File storage manager 205 stores and retrieves electronic files 213 for agent node 200 on storage media 208 as electronic files 216. File storage manager 205, upon receiving electronic file 213, determines where electronic file 213 may be stored based on storage heuristics and storage media definitions 218 retrieved from the list of storage areas 217 associated with storage media available to the agent node, and places the file in file storage 208 as indicated by the computations performed. Upon receiving a request to retrieve electronic file 213, file storage manager 205 retrieves electronic file 216 from file storage 208 and transmits electronic file 213 to virtual machine 203, which then transmits electronic file 213 to the communications interface 202 for transmission as message 210.

Figure 1:
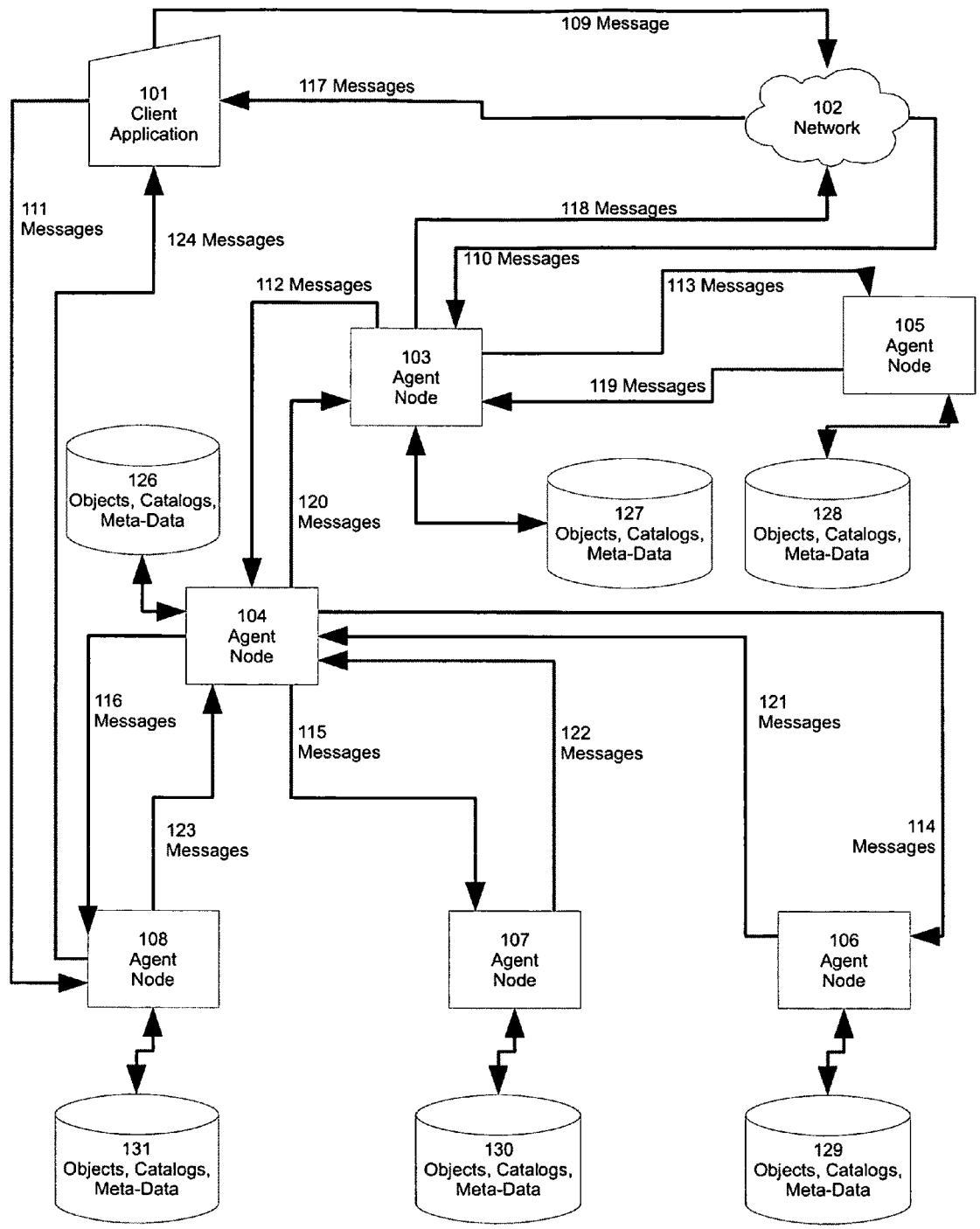
FIG. 1 is a functional block diagram of a series of related agents such as would be found in a collection of servers storing associated attributes.

FIG. 1 is a functional block diagram of a series of related agents 100 such as would be found in a collection of servers storing associated attributes in one embodiment of the present invention. The series of agents 100 includes client entity 101, network 102, such as the Internet or a local-area network, and one or more agent nodes 103-108. Client entity 101 initiates message 110, which is transmitted to a known agent node 103. Agent node 103 examines unique identifier key segments present in message 110 and dispatches copies 112 and 113 of message 110 based on the content of the key segments. The process by which decisions are made based on the content of the key segments will be detailed later in this document.

Agent node 103 may also, based on the content of the key segments, process the message locally after which point it returns message 118 to the client entity 103 via the network 102. Agent node 105, based on messages 113 received from the agent node 103, performs an analysis of identifier key segments contained in message 113, determining from this analysis performed. If actions are taken based on the content of message 113, status and other messages 119 are sent to agent node 103 which then forwards these messages to client entity 101 via the network 102. Since agent node 103 originally sent messages to both agent node 104 and agent node 105, agent node 104 is processing the message 112 received from agent node 103 simultaneously with the processing being performed by agent node 105. As with agent node 105, agent node 104 performs an analysis of unique identifier key segments in message 112, forwarding copies 114, 115, and 116 to agent node 106, agent node 107, and agent node 108, respectively. As was done by agent node 105, agent node 106, agent node 107, and agent node 108 perform any appropriate local processing of messages 114, 115, and 116, respectively, sending reply messages 121, 122, and 123, respectively to agent node 104. These reply messages are then forwarded by agent node 104 to agent node 103 by messages 120. Agent node 103 then forwards these messages to client entity 101 via network 102. In this embodiment of the present invention, not all agents necessarily receive a copy of a message, such as message 110. If the unique identifier key segments indicate that an agent should not receive a message, that agent will not participate in the processing of the message, nor will that agent transmit a copy of the message to any agent(s) to which it is connected. In another aspect of this embodiment, agent node 108 may determine that message 116 must be sent to another set of agents (represented by block 190) via the network connection 191. In this aspect, message 140 is sent to another set of agents as a forwarded copy of message 116. Replies from the other set of remote agents processing message 118 are returned via messages 124. Messages 124 are then forwarded, if appropriate, by agent node 108 via messages 123 to database node 104. Database node 104 then forwards the message received via messages 123 to database node 103 via messages 120. Database node 103 then sends the message to the client entity 101 via messages 118. In a further aspect of this embodiment, objects, object catalogs and meta-data stored in repositories 127, 128, 129, 130 and 131 are manipulated by their respective individual agent nodes 103, 105, 106, 107 and 108.

Figure 3:
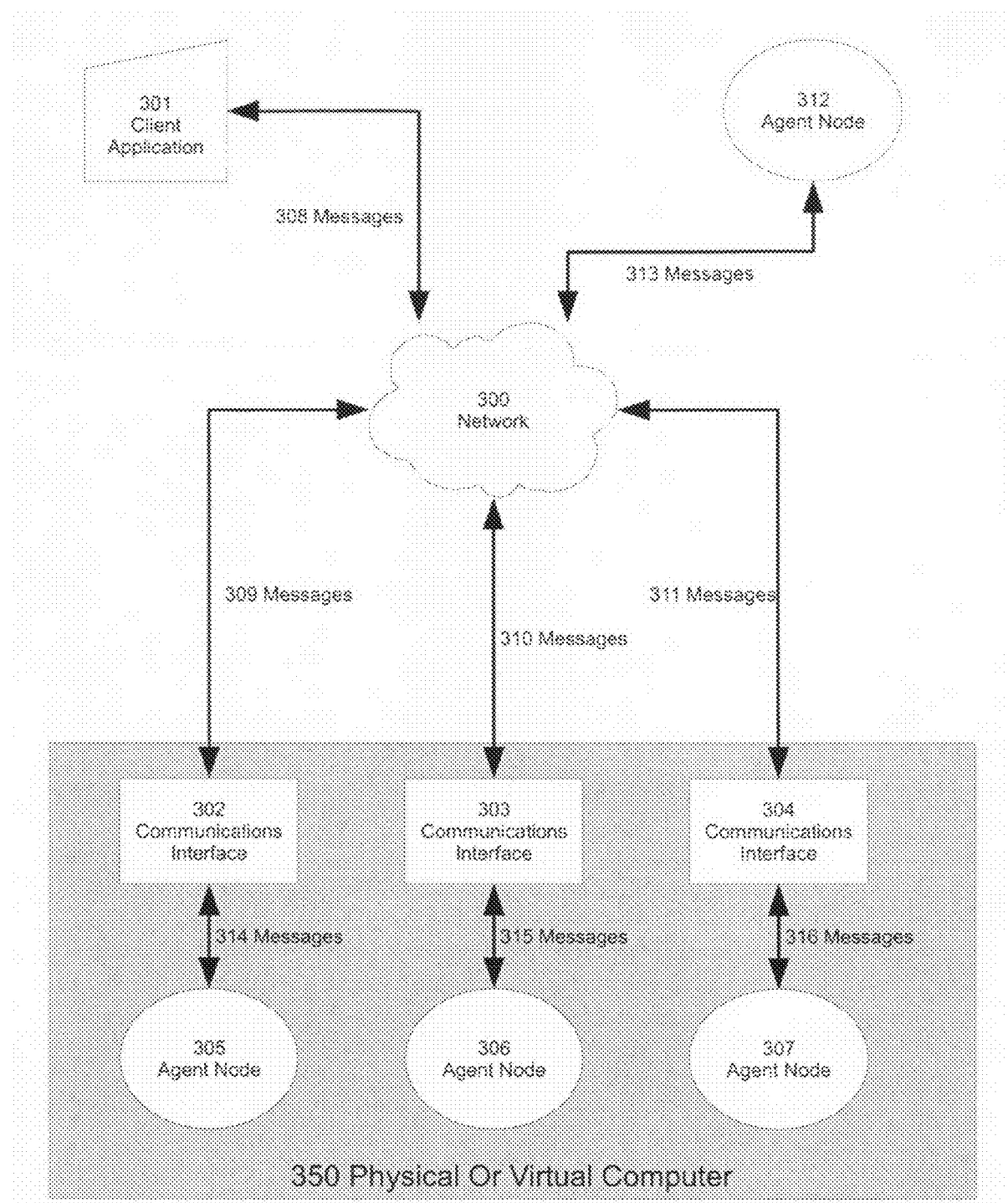
FIG. 3 is a functional block diagram illustrating the relationship between agents and physical computer servers.

FIG. 3 is a block diagram depicting the physical relationship between computer hardware and agent nodes in one embodiment of the present invention. In this diagram, it is shown that client entity 301 may communicate with agent node 312, agent node 305, agent node 306, and agent node 307 as separate agent nodes via messages 308-313 and network 300, though agent node 305, agent node 306, and agent node 307 are all depicted as computer programs being executed by a single database server computer or virtual machine 350. Additionally, messages 309 from agent node 305 may be sent to agent node 312, agent node 306, and agent node 307. Additionally, the communications interface 302, communications interface 303, and communications interface 304 may represent different types of communication methods and capabilities.

Figure 4:
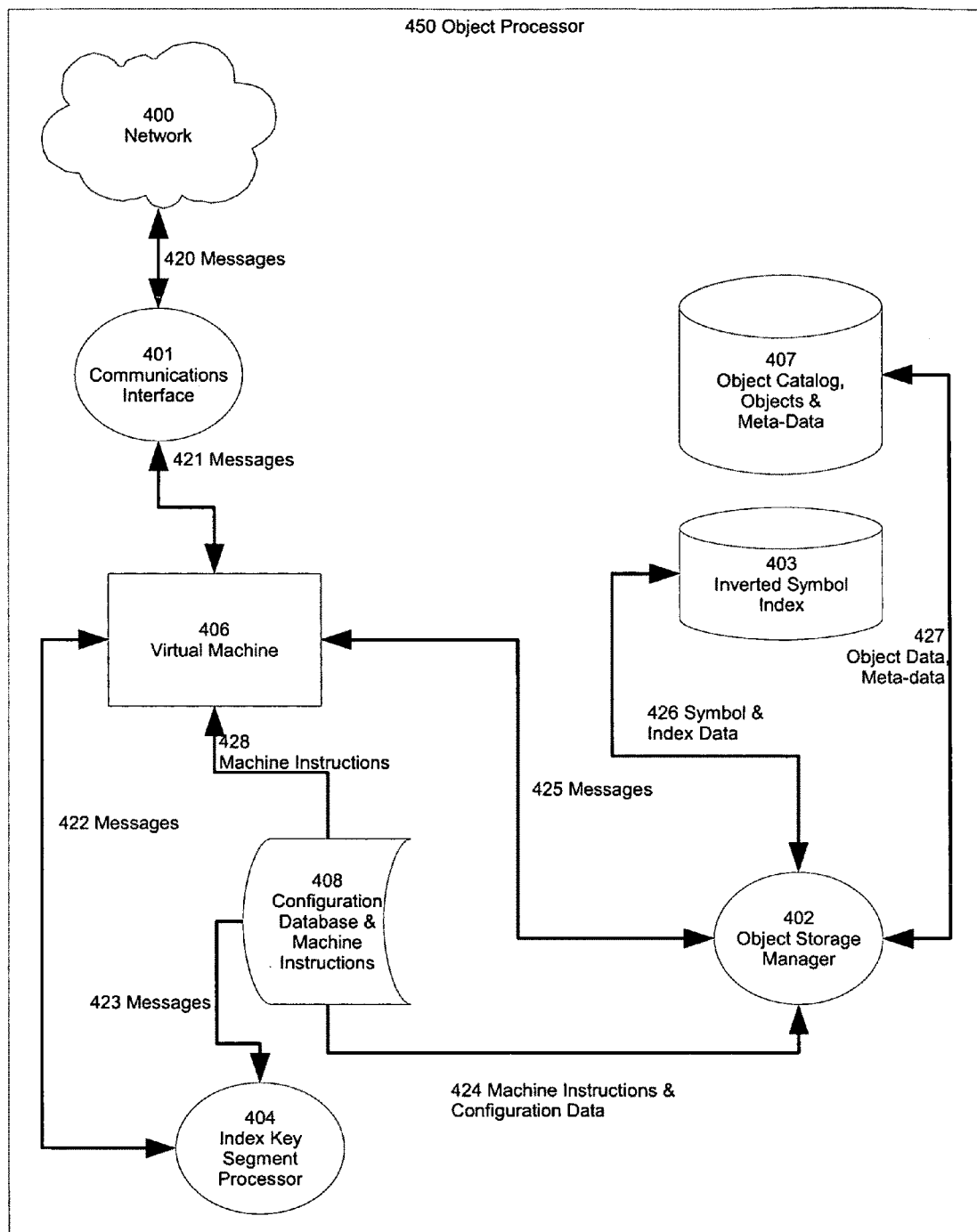
FIG. 4 is a functional block diagram of the components in the database engine.

FIG. 4 is a block diagram detailing the components of object processor 204 found in FIG. 2 of this document as shown in one embodiment of the present invention. Object processor 450 consists of a communications interface 401 (which may represent an applications program interface or API); object storage manager 402, which stores and retrieves variable or fixed-length data records using one or more method(s) (an SQL server or flat-file record handler are two examples), an indexed key segment manager 404, which stores the unique identifier key segments as defined previously for messages and for which the database file layout will be detailed later in this document; and an inverted symbol index 403, which is familiar to those generally practiced in the art. The communications interface 401 performs all coordination between the object storage manager 402, the inverted symbol index 403 and the index key segment processor 404. When messages 420 containing object data and meta-data are received by communications interface 401, they are forwarded as messages 421 to virtual machine 406, which then determines the key segment values using instructions and configuration data 428, as stored in the configuration and machine instruction repository 408. The key segment values are then assembled as unique identifiers, which are then sent to the indexed key segment processor 404 by message pathway 422 for storage based on the configuration data and machine instructions 423 retrieved from the configuration database 408. Object data and object meta-data 427 enclosed in received messages 420 are stored on media 407 accessible to the agent node via the storage manager 402 based on machine instructions 424, and the content of the object data and object meta-data are parsed for content by the object storage manager 402, to create symbol and index data 426 for storage of inverted symbol index 403. Upon receiving a retrieval request message 420, which is forwarded as message 421 to virtual machine 406, virtual machine 406 first identifies all matching object data and object meta-data 427 using the indexed key segment manager 404 and the inverted index 403. Once matching object data and object meta-data have been found, object data and object meta-data are retrieved from object storage manager 402, and a message containing the object data and object meta-data is sent to the communications interface 401 through virtual machine 406.

Figure 5:
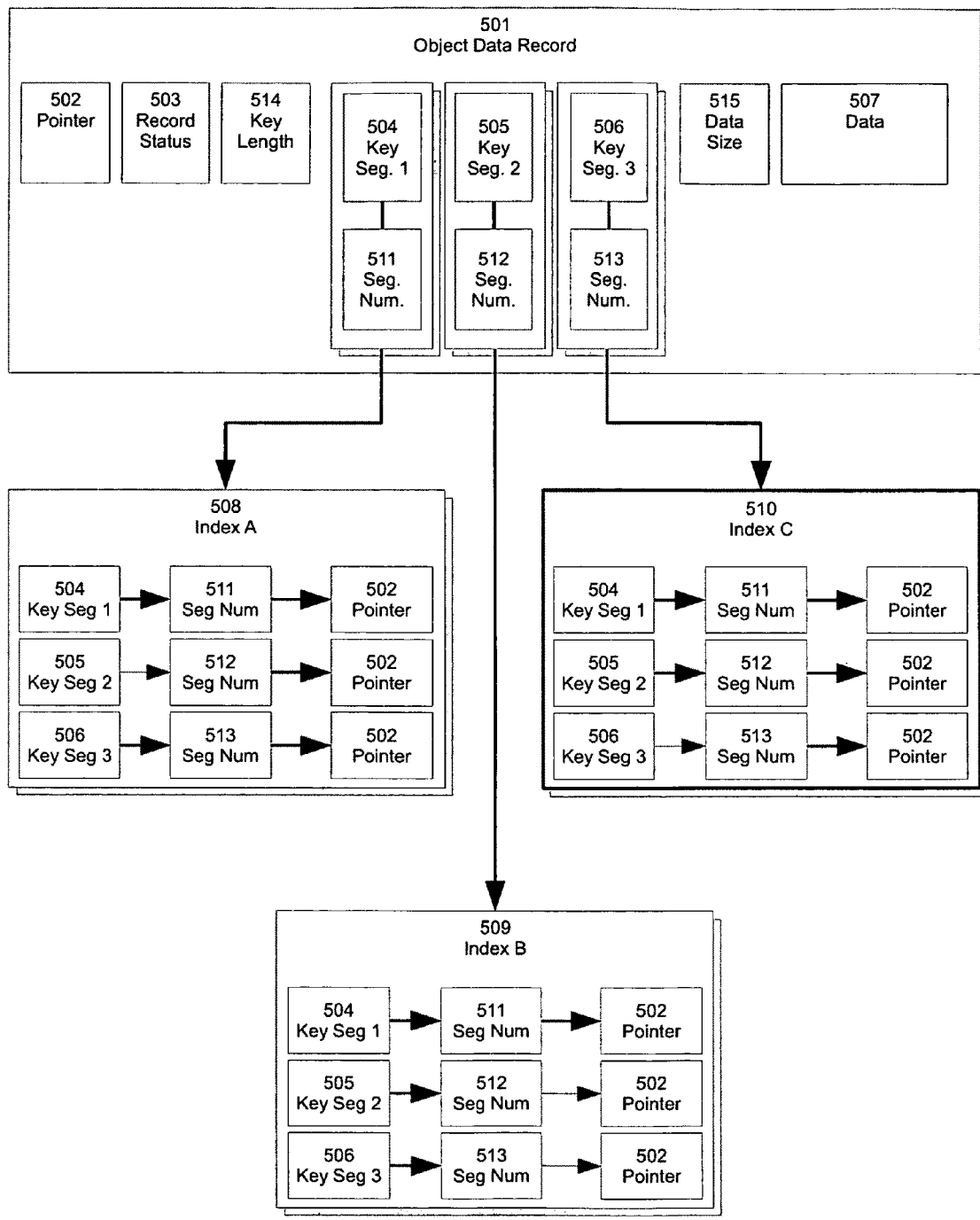
FIG. 5 is a diagram of the relationship between unique identifier key segments and the index files used to store the key segment data.

FIG. 5 is a block diagram of the relationships between object data messages, unique identifier key segment values, and the key segment value indexes according to an embodiment of the present invention. The object data record 501 consists of a unique pointer 502 to the location of object data 507 as stored within a traditional relational database, flat-file record handler or other record storage system. Object data record 501 further contains record status indicator 503, which may be used to indicate whether the object data is available or deleted or has some other special status. The object data record 501 also contains a key length 514, which indicates the total size of the unique identifier including all segment values which may or may not be included in the body of the unique identifier. Additionally, the object data record 501 contains a number of key segments 504-506, a data size indicator 515, and an object data area 507. Each key segment 504-506 contains an implied or explicit segment number 511-513, respectively. Each index 508-510 contains at least three index elements per entry: The key segment value 504, the key segment number 511 and the object data pointer 502. Index A 508, Index B 509, and Index C 510 differ in that each represents a permutation of the three key element types. For the sake of brevity, only three indices are shown in FIG. 5. All indices 508-510 are maintained in sorted order, such that the first element of each key record represents the most significant sort information, the second the next most significant and so on, and such that the last element represents the least-significant sort information.

According to one embodiment of the present invention, an exact match for a given object data block 507 may be found by performing successive retrievals based on the structure of Index B 509. In this method, the search algorithm begins with the set of key records in which key segment value one 504 and the segment number 511 match the desired key segment value and segment number. For each of these matching records, a match where key segment two 505 and key segment number 512 also match the desired value for key segment two, but also where pointer 502 is the same between both records. In the present embodiment, Index C 510 would provide the ability to search for the remaining segment values in <n> requests, where <n> is the total number of key segments. If all searches for all key segments are successful, the object data 507 is found.

In another embodiment of the present invention, a predetermined key segment would contain a unique identifying value for an object data record, and only one search would be required to identify the pointer value 502 necessary to retrieve the data associated with object data 507.

In another embodiment of the present invention, a series of object data values 507 whose key segment values 504-506 match a series of ranges may be found. In this embodiment, Index A 508 is searched for all key values in a segment where the key values occur within a certain range. Matching object data values 507 will be those where further matches performed in Index C 510 match, where a search is performed for the same pointer 502 value found in Index A 508 where the subsequent segment number 511-513 as specified in the search specification is the same, and the segment value 505-506 is within the range given in the search specification.

Figure 6:
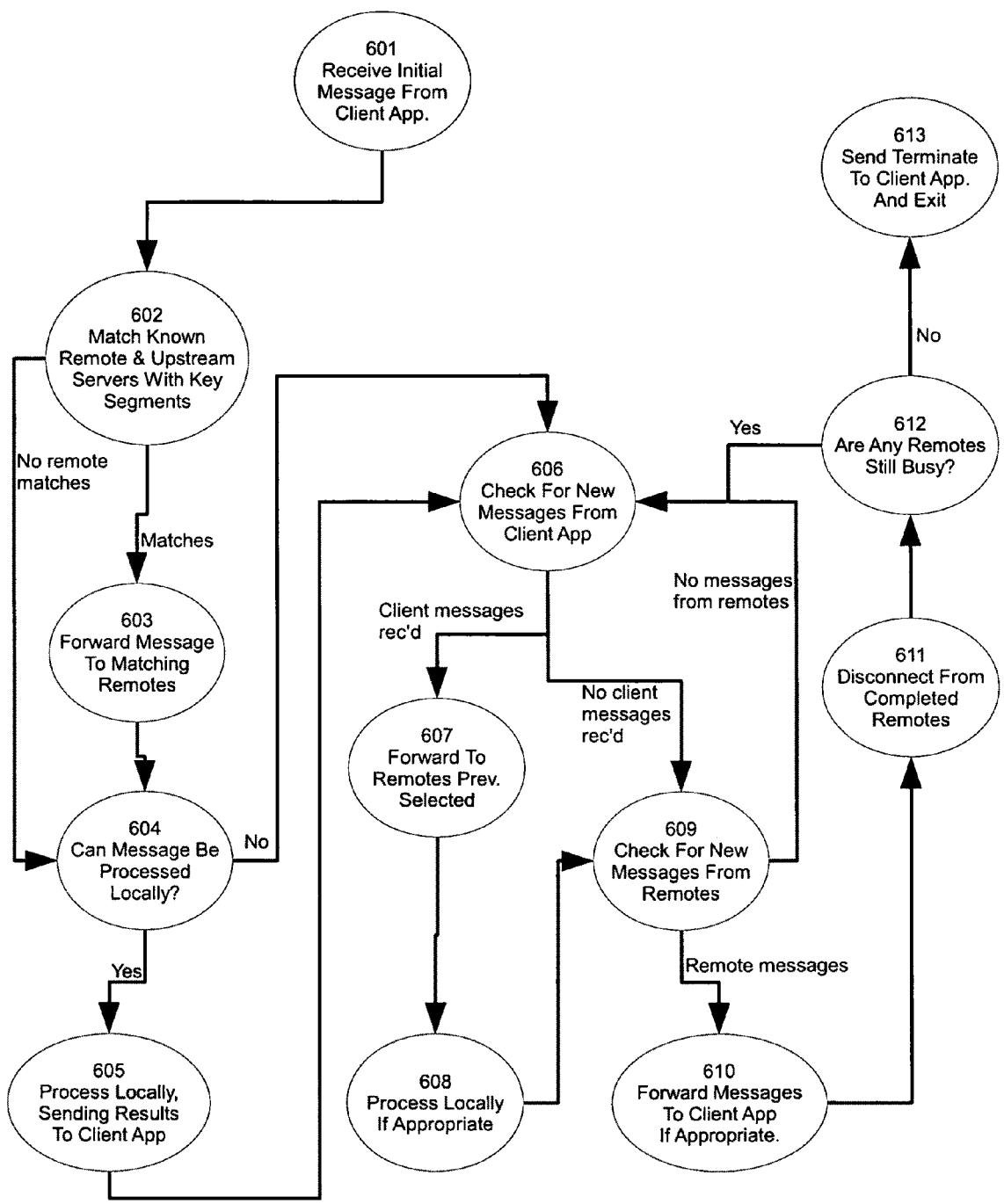
FIG. 6 is a bubble chart describing the message-processing logic used within an agent.

FIG. 6 is a bubble chart detailing the logic used in processing messages received by the communications processor 600 associated with a given agent node. In one embodiment of the present invention, a message is received from a client entity 601. The content of the unique identifier key values obtained from object data and object meta-data stored in the message is applied in comparison to a list of remote agent nodes for which key segment value ranges are known 602. If any remote agents are found to be eligible to receive the message, the message is forwarded to these agents 603. In the subsequent step, the message key segments are examined to see if the message is to be processed locally 604. If so, the message is processed locally 605 and the results of that processing are sent to the client entity 501. The logic now enters a loop, the steps of which consist of checking for new messages from the client entity 601, forwarding them if appropriate to the selected remote agents, checking for messages from the remote agents and forwarding them to the client entity 601. In the first step of the loop, a check is made for new messages 606 from the client entity 601. If new messages are present, these are forwarded to the remote agents previously determined 507, and then are checked for local processing 608. In the next step of the loop, a check is made to determine if any of the remote systems to which messages were sent have sent messages 609. If messages have been received, these are forwarded 610 to the client entity. In the next step 611, any remotes that have indicated they are finished with processing are disconnected. In the next step, a check is made to see if all remotes have finished processing 612. If so, the client entity 601 is notified that processing is complete 613. Otherwise, the loop continues with checking for messages 606 from the client entity.

Figure 7:
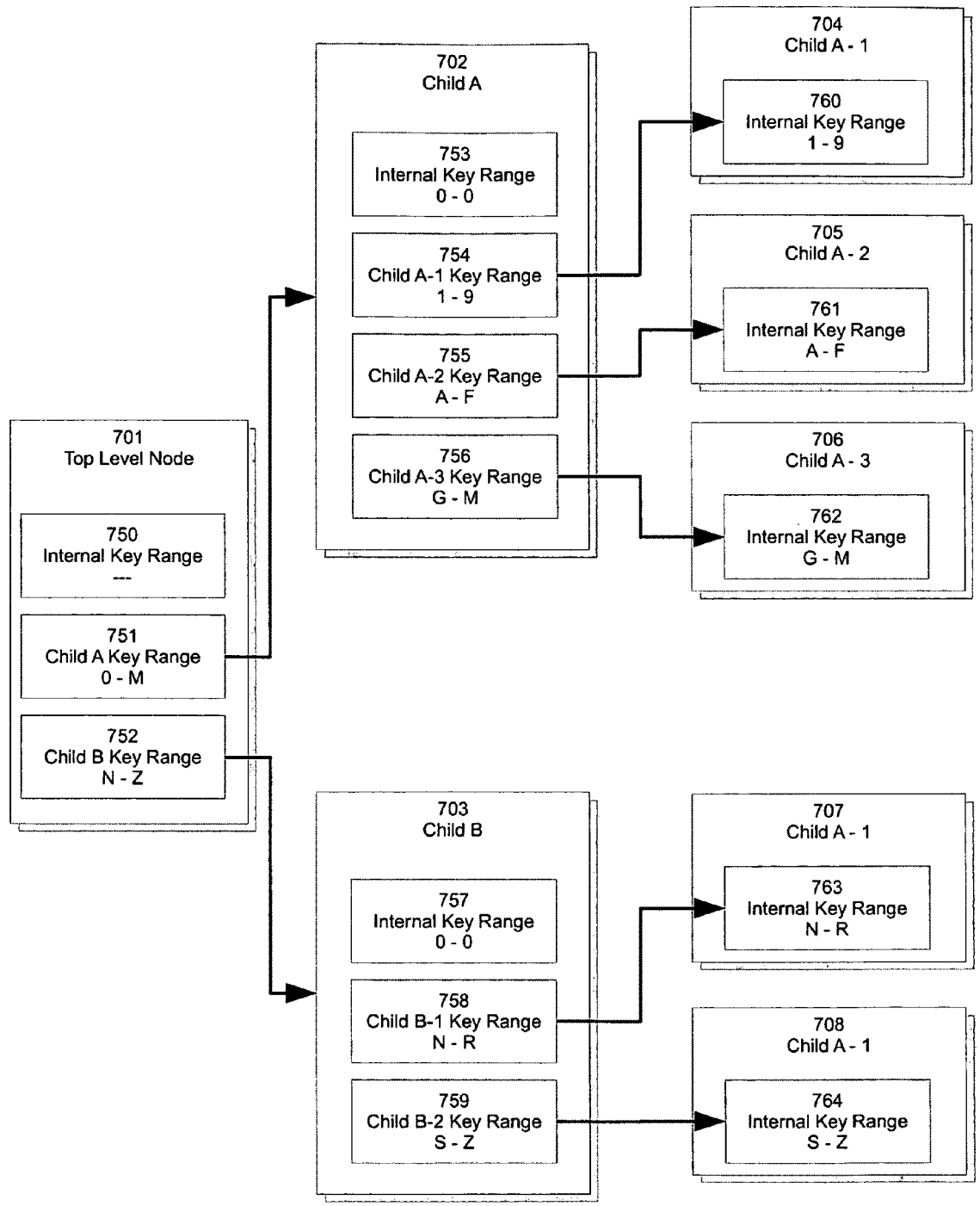
FIG. 7 is a functional block diagram illustrating the relationship among a network of agents in which each agent is responsible for messages with certain unique identifier key segment values.

FIG. 7 is a functional block diagram illustrating an embodiment of the present invention as a series of relationships among a network of agents, wherein each agent is responsible for messages with certain unique identifier key segment values. In the embodiment depicted, there are three sets of agent nodes, each processing a successively narrower range of key values, and there is only one key segment defined. In the embodiment shown, the top level agent 701 is shown as handling no key ranges, but child agent A 702 is able to process key segment values between zero and "M", while child agent B is able to process key segment values between "N" and "Z". As would be expected using the previously described methods for determining message routing, the result of this arrangement is that the top level agent 701 will never process messages locally, but will instead forward all messages to either child A 702 or child B 703. Proceeding, child A 702 is able to process all messages with key segment values of zero. For all others, child A-1 704 is shown as able to process messages with key segment values of "1" to "9" and child A-2 705 is shown as able to process messages with key segment values of "A" to "F", and finally child A-3 706 is shown as able to process messages with key segment values of "G" to "M". Proceeding to the next level of detail, it is shown that child A-1 704 can process messages with key segment values between "1" and "9". For the sake of brevity, further discourse on the message ranges will be withheld. However, this same methodology is used for the remaining agent nodes. In another embodiment of the present invention, agent nodes may have identical key segment range settings, permitting automatic duplication and parallelization of stored attribute data.

Figure 8:
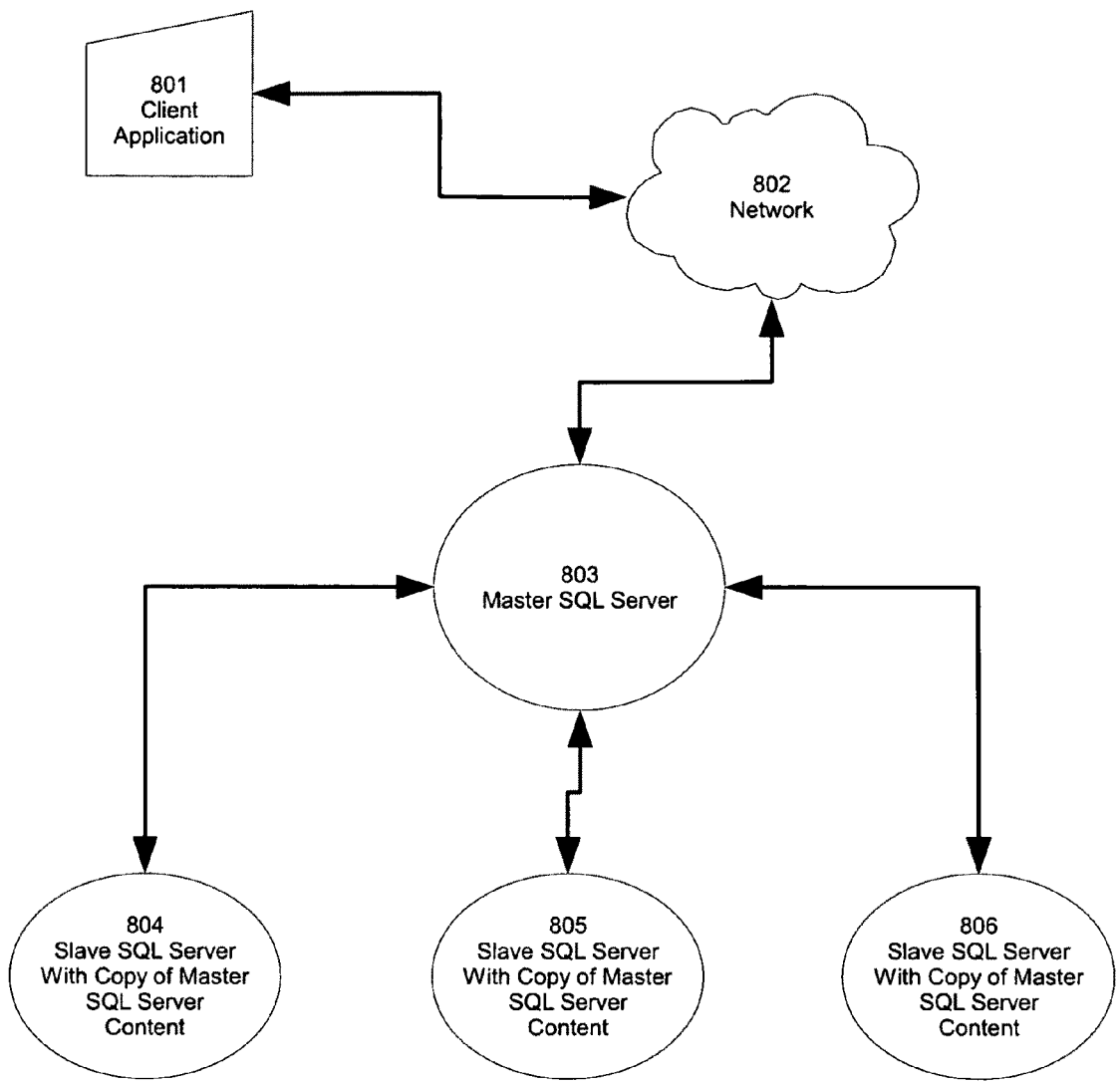
FIG. 8 is a functional block diagram describing the structure of a parallel SQL database architecture utilizing multiple complete database copies.

FIG. 8 is an embodiment of prior art consisting of a block diagram of a distributed database organized as a set of replicated databases on slave servers 805807 attached to a master server 803. SQL commands 810 are received from a client application 801 and transmitted through a network 802 to be received by a master SQL server 803. The master SQL server 803 dispatches the SQL commands 811 received to one of the slave servers 805-807, normally attempting to find the slave with the lowest overall load factor. Updates received by the master SQL server 803 are applied in parallel to all slave SQL servers 805-807. In another embodiment of this prior art, remote applications connect directly to the slave servers 805-807 for all retrieval operations and connect to the master server 803 for all update and storage operations.

Figure 9:
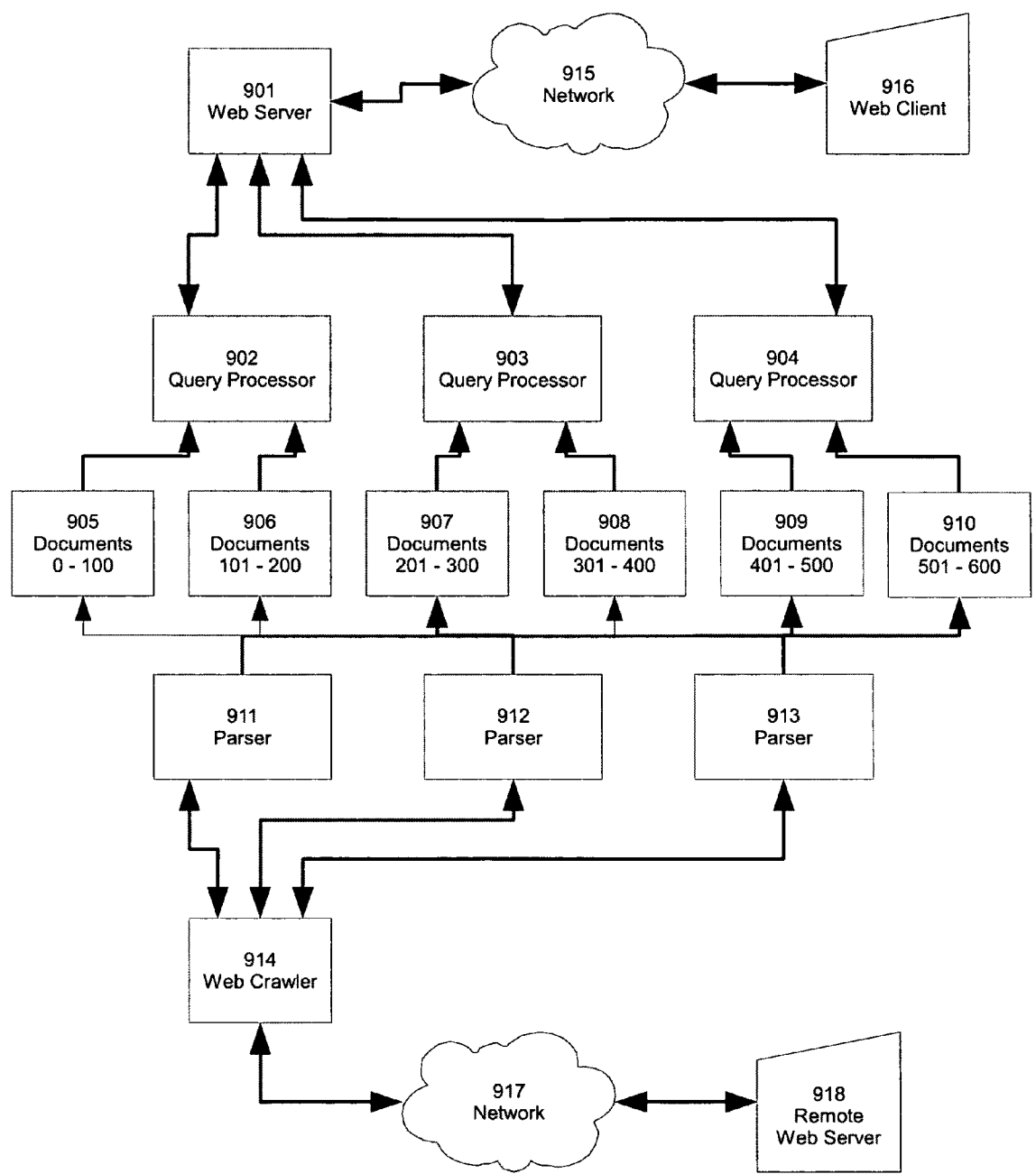
FIG. 9 is a functional block diagram describing the typical structure of a large Internet search engine.

FIG. 9 represents prior art and consists of a block diagram of the functional elements in a typical Internet search engine 900. In the typical embodiment of the prior art, a web server 901 generates requests from an HTML form displayed at the workstation for a user, which are then handled by query processors 902-904. The query processors 902-904 generate search requests, which are then dispatched in parallel to a series of database servers 905-910, each of which contains a subset of the total collection of documents or data being searched. Each database server 905-910 subsequently returns a small set of matching documents; all sets are then merged by the query processors 902-904 and returned to the web server 901 for presentation. To collect data later used for searches, a web crawler 914 collects the text from web pages scattered across the Internet, forwarding these to a series of parsers 911-913, which reduce each page to a set of unique words. These unique words are then stored by the database servers 905-910 for later searches.

Figure 10:
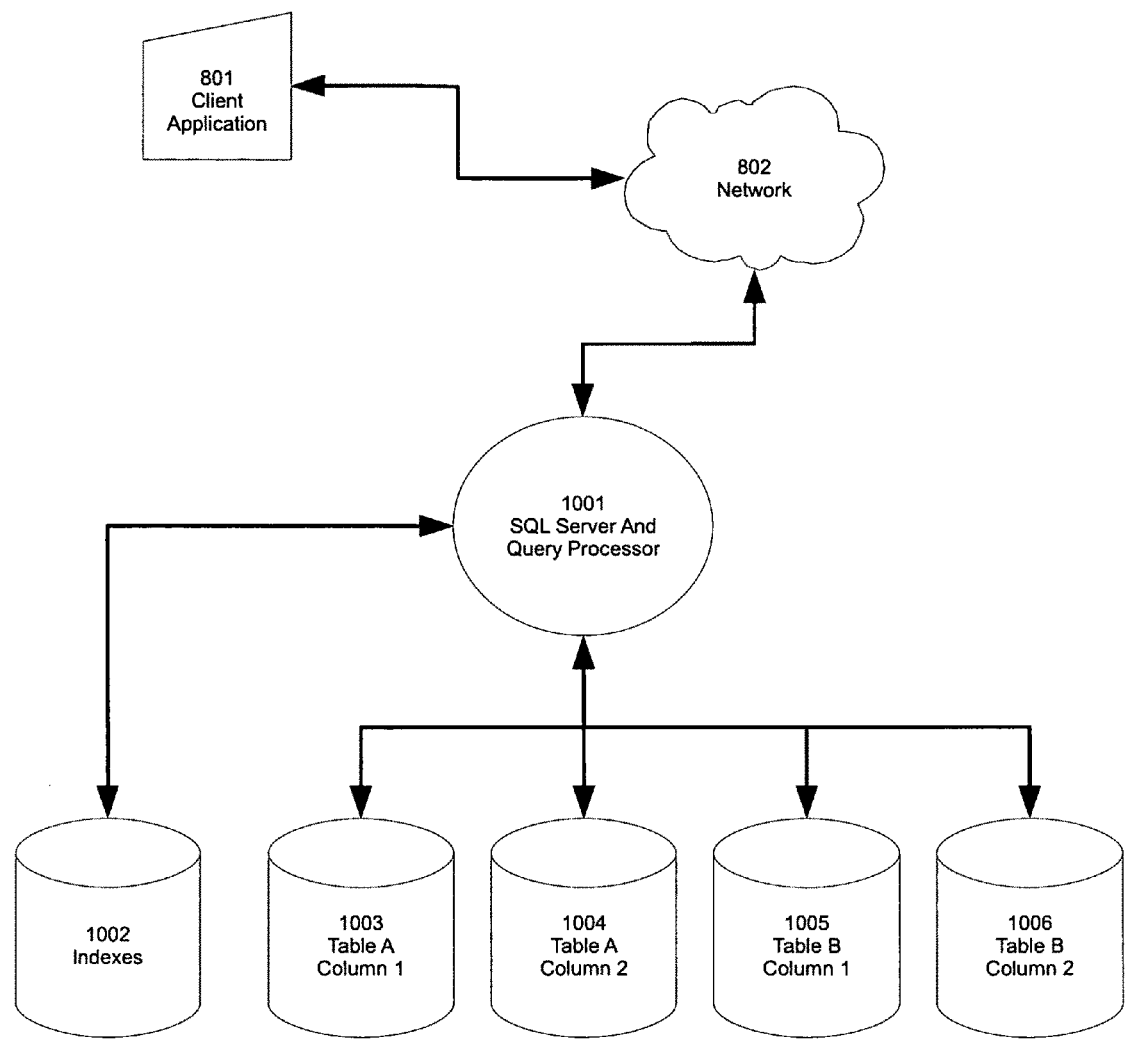
FIG. 10 is a function block diagram describing the structure of a parallel SQL database architecture utilizing distributed table columns.

FIG. 10 represents prior art and consists of a block diagram of the functional elements within a distributed relational database 1000. In this embodiment of the prior art, an SQL interpreter and query processor 1001 is used to forward queries to an index database server 1002 which returns the row numbers for all matching rows in a table. The SQL query processor 1001 subsequently retrieves the columns for the matching tables from the database servers 1003-1006 that contain the individual columns of each table. In the embodiment shown, server 1002 contains all index records for primary and secondary indexes, server 1003 contains all rows for column "1"

in table "A", server 1004 contains all rows for column "2" in table "A", server 1005 contains all rows for column "1" in table "B", and server 1006 contains all rows for column "2" in table "B". In another embodiment of the prior art, servers 1004-1006 may contain any combination of rows and index records for a given column in a relational database table, or any combination such that each server 1004-1006 contains the content of an entire table.

Figure 11:
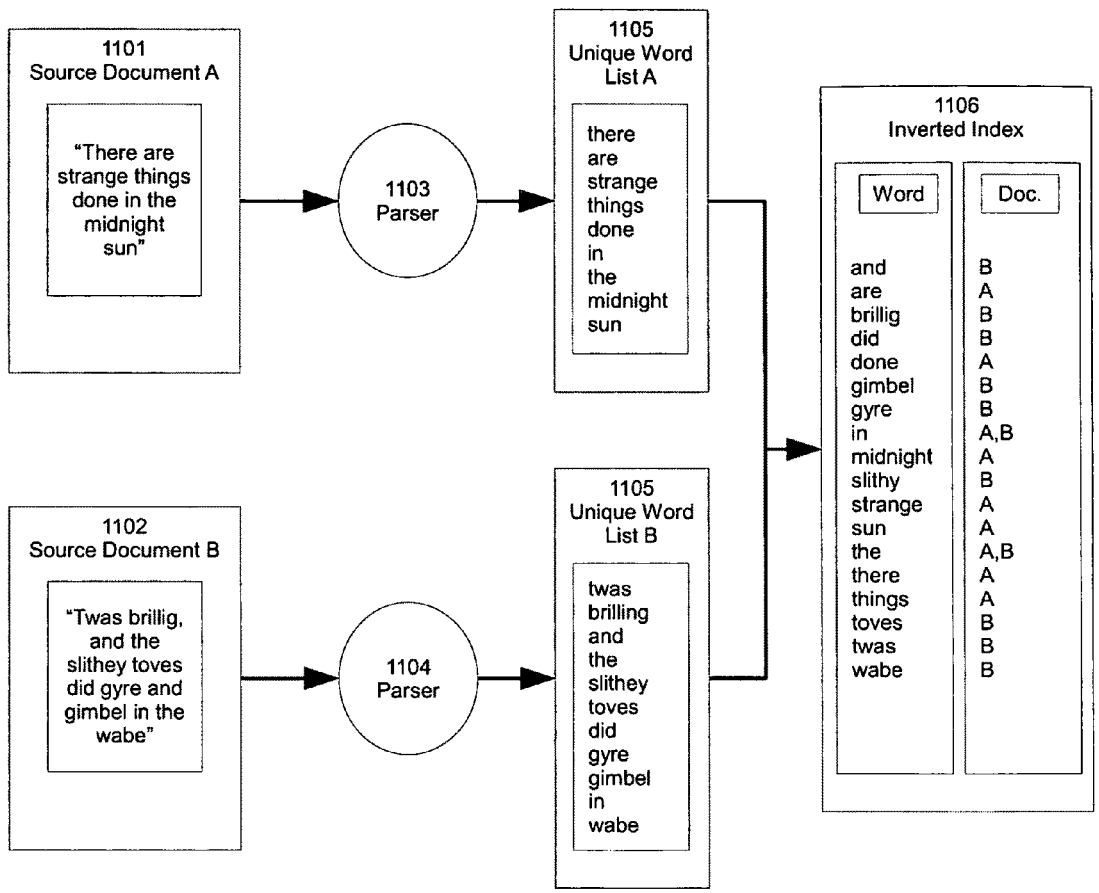
FIG. 11 is a diagram describing the structure of an inverted index.

FIG. 11 represents prior art and consists of a diagram of the functional elements of an inverted index, as is understood by those proficient in the art. In the inverted index 1100, words are extracted from source uniquely identified documents 1101,1102 by parsers 1103,1104 which reduce the documents to a set of unique words 1105,1106 such that the sets of unique words 1105,1106 contain a single instance of any word in the source documents 1101,1102 regardless of the number of occurrences of that word in the original text. The unique word lists 1105,1106 are combined and extended into an inverted index 1107, such that for each word listed, the unique identifier for each document 1101,1102 in which the word occurs is associated with the word in the inverted index 1107. Thus, as will be understood by those proficient in the art, retrieving the entry for any word will cause a list of the documents in which the word occurs to be made available to the entity performing the query.

Figure 12:
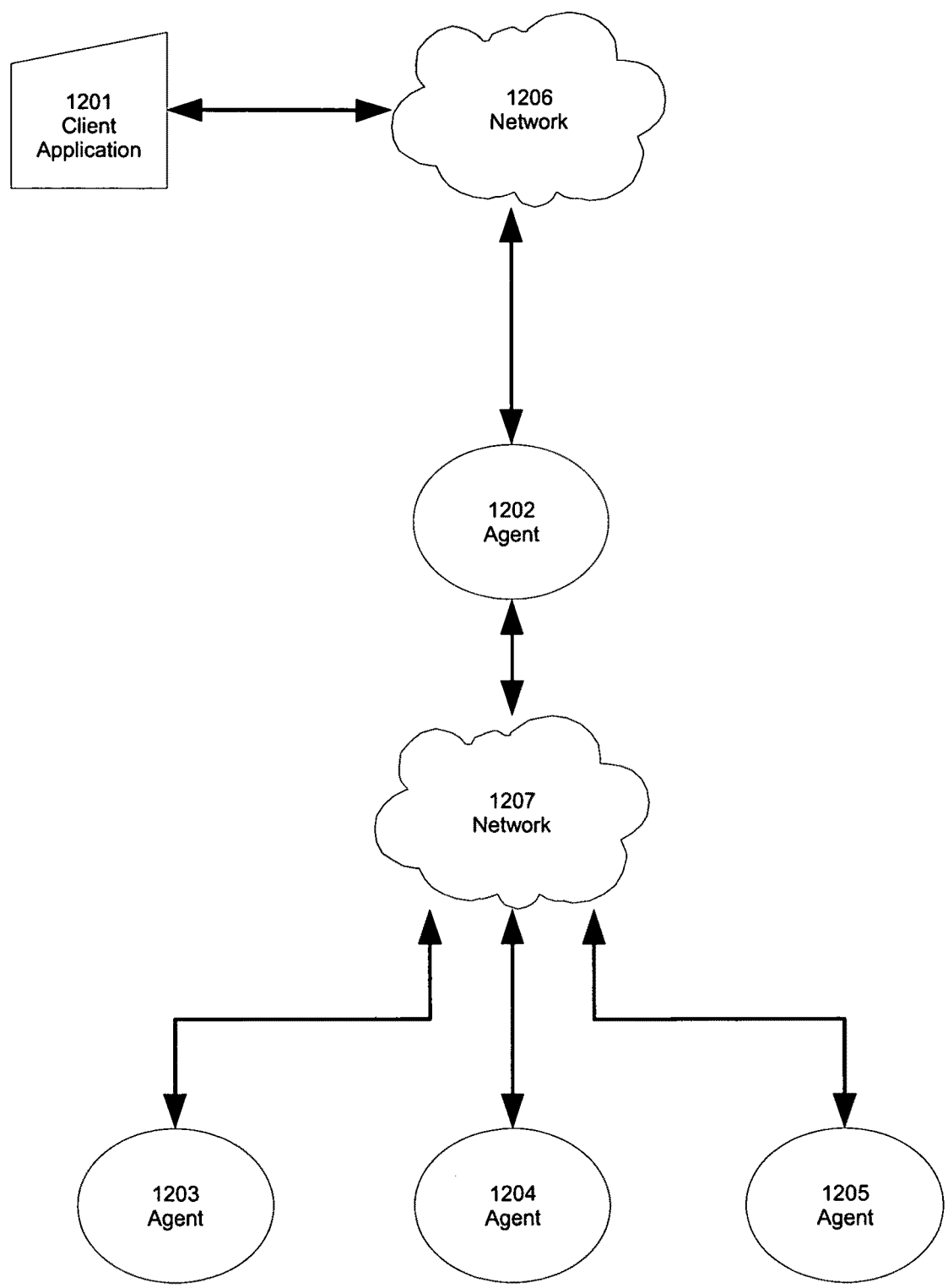
FIG. 12 is a diagram illustrating the relationships between clients and agents.

FIG. 12 is a flowchart illustrating another embodiment of the present invention which is representative of a variation of the embodiment described in FIG. 1. In the present embodiment, client application 1201 sends messages via message pathway 1210 to network 1206. Network 1206 forwards these messages via message pathway 1211 to a designated agent node 1202. By means of algorithmic processing of the received messages, agent node 1202 transmits single or multiple messages 1212 to network 1207 which then distributes these messages using message pathways 1213, 1214 and 1215 to agent nodes 1203, 1204 and 1205. Subsequent to processing at agent nodes 1203, 1204 and 1205, response messages are sent by message pathways 1213, 1214 and 1215 to network 1207. Network 1207 sends these response messages to agent node 1202, which then processes the messages. Subsequent to processing, agent node 1202 transmits reply messages by message path 1211 to the network 1206, which transmits the same messages by message pathway 1210 to the client application 1201.

While certain preferred and alternative embodiments of the invention have been described, such description is for illustrative purposes only, and it is to be understood that changes and variations may be made without departing from the spirit or scope of the following claims.

What is claimed is:

1. A method of assembling a plurality of object catalogs, the method comprising:
    creating a plurality of data storage areas within a plurality of computer data storage devices where each storage area contains a plurality of ordered lists with a plurality of ordering methods, each list with a plurality of entries where each entry contains data describing the entry, a plurality of unique object identifiers associated with the entry, and a plurality of data storage blocks for structured and unstructured data associated with the entry;
    creating a plurality of ordered lists with a plurality of ordering methods where each entry in the ordered lists contains a plurality of entries where the plurality of entries contain a plurality of unique identifiers associated with object entries within storage areas and a plurality of entries representing pointers to a plurality of entries within the plurality of ordered lists containing unique identifiers;
    creating a plurality of ordered lists containing a plurality of entries with a plurality of unique identifiers, each unique identifier being associated with a plurality of object entries or data blocks associated with a plurality of object entries;
    creating a plurality of ordered lists containing a plurality of entries where each entry contains a plurality of symbolic values, each symbolic value containing a plurality of byte values of a known count and each entry containing a plurality of pointers, each referencing a plurality of object entries within the ordered lists contained within the data storage areas; and
    storing or retrieving a plurality of object data and meta-data in the heretofore described plurality of storage areas containing a plurality of ordered lists containing a plurality of entries each containing a plurality of associated object data and meta-data wherein each is given a plurality of unique identifiers according to the content of messages sent or received in communication with an agent computer program.

2. The method of claim 1 wherein the agent computer program determines the interconnected plurality of agent computer programs to receive messages based on a computer-generated pattern that is compared to the message content.

3. The method of claim 1 wherein the agent computer program determines the interconnected plurality of agent computer programs to receive messages based on a pattern created through human input.

4. The method of claim 1 wherein the agent computer program determines the interconnected plurality of agent computer programs to receive messages based on a computer-generated pattern that is created or altered based on events sensed by the computer.

5. The method of claim 1 wherein the agent computer program determines the interconnected plurality of agent computer programs to receive messages based on a computer-generated pattern that is created or altered based on information received or sensed by the computer.

6. The method of claim 1 wherein the agent computer program determines the interconnected plurality of agent computer programs to receive messages based on a patterns contained with the object data, object meta-data and enclosed meta-data contained within a message received by the computer agent program.

7. The method of claim 1 wherein the agent computer program determines the interconnected plurality of agent computer programs to receive messages based on a pattern containing a plurality of individual patterns.

8. The method of claim 1 wherein the computer is running a plurality of agent computer programs for processing messages.

9. The method of claim 1 wherein the computer is running a plurality of agent computer programs for processing messages, each agent computer program processing messages which contain data or meta-data conforming to a plurality of patterns constituting a class.

10. The method of claim 1 wherein the computer is running a plurality of agent computer programs for processing messages, each agent computer program processing messages which contain data or meta-data conforming to a plurality of patterns, the plurality of patterns divided such that multiple pluralities of patterns constitute a plurality of classes.

11. The method of claim 1 wherein the agent computer program determines the interconnected plurality of agent computer programs to receive messages based on a pattern wherein the plurality of interconnected agent computer programs includes a plurality of collections of a plurality of agent computer programs.

12. The method of claim 1 wherein the agent computer program determines the interconnected plurality of agent computer programs to receive messages based on a pattern wherein the intersection of the pattern specification and the plurality of agent computer programs to receive messages comprises a plurality of collections of a plurality of agent computer programs.

13. The method of claim 1 wherein the agent computer program determines the messages to be processed based on a computer-generated pattern.

14. The method of claim 1 wherein the agent computer program determines the messages to be processed based on a pattern generated as a result of human input or activity.

15. The method of claim 1 wherein the agent computer program determines the messages to be processed based on a computer-generated pattern, wherein the pattern is altered or created based on events sensed by the computer.

16. The method of claim 1 wherein the agent computer program transmits messages to a plurality of interconnected agent computer programs using a scheduled transmission process.

17. The method of claim 1 wherein the agent computer program receives messages from a plurality of interconnected agent computer programs using a scheduled transmission request.

18. The method of claim 1 wherein the agent computer program determines the messages to be processed based on a computer-generated pattern, wherein the pattern is altered or created based on external input to the computer.

19. The method of claim 1 wherein the agent computer program creates messages and transmits those messages to a plurality of interconnected agent computer programs as a result of receiving messages from a plurality of interconnected agent computer programs.

20. The method of claim 1 wherein the agent computer program creates messages and transmits those messages to a plurality of interconnected agent computer programs as a result of events or conditions sensed by the computer.

21. The method of claim 1 wherein messages contain a sequential record of the plurality of agent computer programs through which a message has transited.

22. The method of claim 1 wherein messages contain a sequential record of the plurality of computers through which a message has transited, wherein each computer runs a plurality of message processing programs.

23. The method of claim 1 wherein messages contain a sequential record of the plurality of agent computer programs through which a message has transited and where the sequential record contains an identifier for each agent computer program and each identifier includes the time at which the message was received by an agent computer program.

24. The method of claim 1 wherein messages contain a sequential record of the plurality of agent computer programs through which a message has transited and where the sequential record contains the time at which the message was received, the time at which the message was processed by the agent computer program, and the time at which messages were generated by the agent computer program as a result of processing the received message.

25. The method of claim 1 wherein messages contain object data which are subsequently stored at the computer on computer media such as magnetic disk by the agent computer program.

26. The method of claim 1 wherein the agent computer program determines the interconnected plurality of agent computer programs to receive messages based on a computer-generated pattern which is compared to object identifiers associated with message meta-data.

* * * * *